W. J. WALLINGFORD.
Improvement in Corn-Planters.
No. 132,783. Patented Nov. 5, 1872.
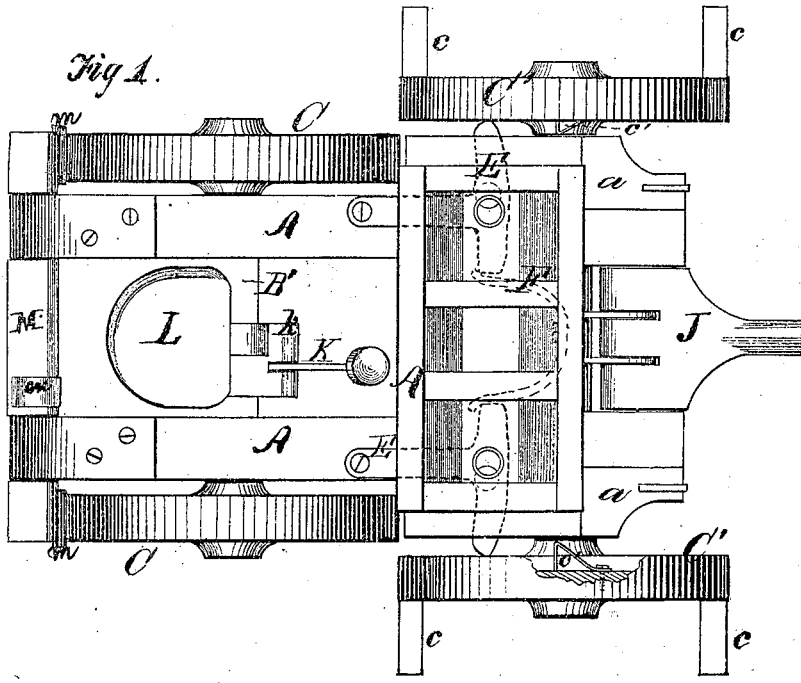
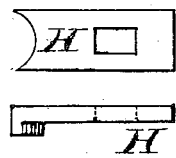
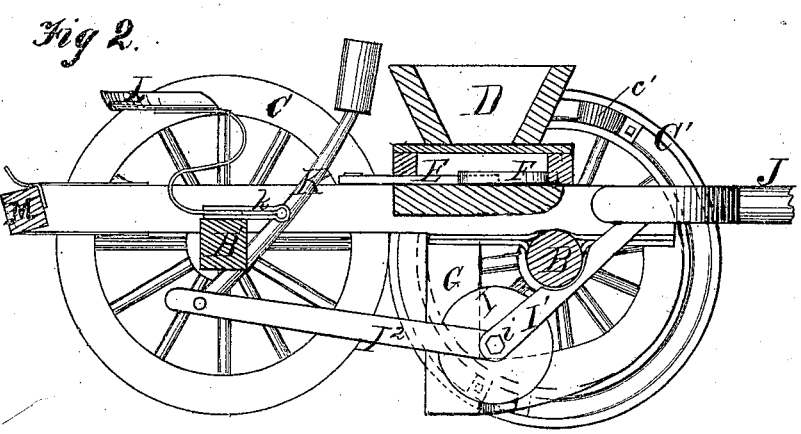
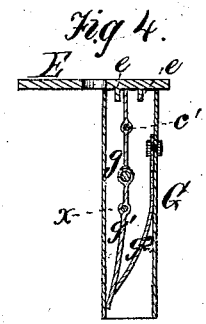

UNITED STATES PATENT OFFICE.

WILLIAM JAMES WALLINGFORD, OF PORTLAND, ILLINOIS.

IMPROVEMENT IN CORN-PLANTERS.

Specification forming part of Letters Patent No. 132,783, dated November 5, 1872.

*To all whom it may concern:*

Be it known that I, WILLIAM JAMES WALLINGFORD, residing in Portland, county of Whitesides, and State of Illinois, have invented a certain new and useful Improvement in Corn-Planters, of which the following is a specification:

In the annexed drawing, Figure 1 represents a plan view of my improved corn-planter; Fig. 2 is a longitudinal section of the same; Fig. 3, a plan and a side view of the device used in regulating the number of grains of corn to be dropped; and Fig. 4, a vertical section of one of the legs or spouts and of one of the distributer-bars, exhibiting the internal construction and arrangement of the parts of the former and the pins or projections of the latter, which operate the said parts of the legs.

In the several figures identical parts are designated by corresponding letters.

In the accompanying drawing, A A refer to two longitudinal bars, which are mounted upon a front and a hind axle, marked, respectively, B B'. The front axle B is attached to the said bars A A by means of metallic boxes so as to allow of its having an independent rotary movement. C C refer to the hind wheels, which are journaled upon the stationary or hind axle B' in a line with or immediately in rear of the legs or spouts, through which the corn is conducted to the ground, for the purpose of causing said wheels to pass over and force the corn dropped down into the furrows formed for the same. C' C' refer to the front wheels, whose axle B is of such a length as to permit them to be set out a sufficient distance from the bars A A as to allow of the interposition of bars $a\ a$ rigidly secured to said axle, and to the rear ends of which bars are fastened the legs or spouts above referred to, and to be hereinafter more fully described. The wheels C' C' are provided upon their outer sides, at or near their peripheries, with bars $c\ c$ of a triangular shape, and so attached to the said wheels as that when they are revolved the said bars will be brought in contact with and caused to demolish the "hills" of former rows of corn. Upon the inner sides of these wheels are formed annular grooves, into which are set metallic projections or plates $c'\ c'$, the office of said grooves being to obviate contact between the wheels and the projecting ends of the distributer-bars, and that of the said plates to strike the latter, whereby a vibratory movement may be communicated to the distributer-bars for the purpose of alternately throwing their openings in and out of line with the corn-dropping holes in the hopper, thereby performing the operation of dropping the corn at the desired points in the ground. D refers to the hopper for the reception of and holding the corn, which is supplied with three or more cells, in the bottom of two of which are holes for the escape of the grains of corn. E E refer to two T-shaped metallic bars, denominated the distributer-bars, the shanks or stems of which are fastened to the bars A A so as to have lateral play, while those portions thereof running at right angles to the said stems are supplied each with a hole at the center, and made to extend underneath the hopper D sufficiently far to bring their apertures or holes in a vertical plane with the holes in said hopper when the projecting ends thereof have been thrown in under said hopper. Hence, it will be seen when the distributer-bars occupy the position just ascribed to them that the grains of corn will be allowed to make their exit from the hopper preparatory to being deposited in the ground. F refers to a U-shaped spring, fastened at its center or apex to a bar located beneath the hopper D, and pressing at its ends against the inner ends of those portions of the distributer-bars running at right angles to their stems or shanks. This spring is for the purpose of throwing the projecting ends of the said bars out from under the hopper D after they have been struck by the projections or plates $c'\ c'$ upon the wheels C' C', by which the holes in the distributer-bars are thrown out of line with the holes in the bottom of the said hopper and the escape of the corn cut off thereby. G G refer to the "legs" or spouts above alluded to, which consist of rectangular or other suitably-shaped receptacles, and which are fastened in any known way and by suitable means to the bars $a\ a$ and directly beneath and around the holes in the hopper D. These legs are for the purpose of conducting the corn to the ground. $g\ g^1$ refer to a "gate" supplied to each of the legs, but only one of which is shown, the upper part $g$ being hinged to the lower part $g^1$ within and to the said legs, as shown in Fig. 4. Against the lower extremity of the part $g^1$ of the said gate or gates presses a spring, $g^2$, which is bolted or otherwise secured to the leg or legs. To retain the said parts of the gate $g\ g^1$ in place, and at the same time allow them to have such a movement as that when the upper part is moved in one direction the lower part shall have a contrary direction, they are, as well as hinged, as above stated, each pivoted within and to the said legs G at the points $x\ x'$, whereby the said gate will be opened and closed as the projections $e\ e$ upon the distributer-bars E E are brought in contact with or relieved therefrom through the vibratory movement of said bars, thus allowing the grains of corn entering the legs from the hopper through the holes in the said bars to be dropped into the ground at the proper intervals and the desired distances apart. H refers to a device which is designed to be used in connection with the hopper D for the purpose of regulating the number of grains of corn which it is desired to drop at a single instant. This device or contrivance is constructed substantially as shown in Fig. 3. I has reference to a small wheel or truck, which is journaled upon a pin or axle, $i$, forming a pivot for the connection of the bifurcated or jointed ends of the metallic bars $I^1$ and $I^2$ together, the said pin or axle enabling the truck to be held between the said bifurcated ends. The upper end of the bar $I^1$, and also that of the bar $I^2$, are also pivoted, the one, $I^1$, to the tongue J of the machine and the other, $I^2$, to the lower end of a hand-lever, K, which is, in turn, pivoted to a metallic plate, $k$, fastened to rear axle B'. By grasping and pushing this lever forward or from you it will be observed that the truck or wheel I will be elevated from off the ground, and by imparting the contrary movement of the said lever the truck will be depressed in such a manner as to elevate the front wheels or front part of the planter and take the place of said wheels for supporting this part of the machine, the object of which being to throw the corn-dropping mechanism out of operation while the planter is being turned around or reversed. A series of apertures may be supplied to this lever in order that the same may be pivoted at any point desired. L is the driver's seat, which is secured upon the rear axle of the planter by means of an S-shaped spring suitably connected to the said seat and axle. M refers to a transverse bar, having its bearings in boxes fastened to the rear ends of the longitudinal bars A A, and supplied with plates $m\ m$ at points opposite the hind wheels, which remove dirt from the said wheels. A plate, $m'$, is fastened to the upper side of the bar M to receive the foot of the driver or operator in applying the said bar to the wheels.

Claim.

The combination of the bars A having the cleaner M $m$, axles B B', wheels C C' $c\ c'$, distributer-bars E, spring F, seed-box D, and legs G $g\ g^1$, all constructed and arranged to operate substantially as and for the purpose set forth.

In testimony whereof I have hereunto signed my name this 29th day of June, A. D. 1872, in presence of two subscribing witnesses.

WILLIAM JAMES WALLINGFORD.

Witnesess:
HENRY D. BRECKENRIDGE,
WILLIAM H. BOWEN.